US009733371B2

(12) United States Patent
Burnett et al.

(10) Patent No.: US 9,733,371 B2
(45) Date of Patent: Aug. 15, 2017

(54) CREATING SEISMIC IMAGES USING EXPANDED IMAGE GATHERS

(71) Applicants: William A. Burnett, Houston, TX (US); Andrew P. Shatilo, Houston, TX (US); Thomas A. Dickens, Houston, TX (US)

(72) Inventors: William A. Burnett, Houston, TX (US); Andrew P. Shatilo, Houston, TX (US); Thomas A. Dickens, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 318 days.

(21) Appl. No.: 14/322,273

(22) Filed: Jul. 2, 2014

(65) Prior Publication Data
US 2015/0063066 A1    Mar. 5, 2015

Related U.S. Application Data

(60) Provisional application No. 61/874,281, filed on Sep. 5, 2013.

(51) Int. Cl.
*G01V 1/30* (2006.01)

(52) U.S. Cl.
CPC ............ *G01V 1/30* (2013.01); *G01V 2210/51* (2013.01)

(58) Field of Classification Search
CPC . G01V 1/28; G01V 1/30; G01V 1/301; G01V 2210/20; G01V 2210/24; G01V 2210/27; G01V 2210/51
USPC ..................................................... 367/38, 50
See application file for complete search history.

(56) References Cited

U.S. PATENT DOCUMENTS

| | | | |
|---|---|---|---|
| 5,500,832 A * | 3/1996 | Berryhill | G01V 1/301 367/50 |
| 5,532,977 A | 7/1996 | Thore | |
| 6,101,448 A | 8/2000 | Ikelle et al. | |
| 6,128,580 A | 10/2000 | Thomsen | |
| 6,212,477 B1 | 4/2001 | Zhu et al. | |
| 6,470,274 B1 | 10/2002 | Mollison et al. | |
| 6,473,696 B1 | 10/2002 | Onyia et al. | |
| 6,493,632 B1 | 12/2002 | Mollison et al. | |

(Continued)

OTHER PUBLICATIONS

Cary, P.W. (1999), "Common-offset-vector gathers: an alternative to cross-spreads for wide-azimuth 3-D surveys," *SEG Expanded Abstracts*, pp. 1496-1499.

(Continued)

*Primary Examiner* — Ian J Lobo
(74) *Attorney, Agent, or Firm* — ExxonMobil Upstream Research-Law Department

(57) ABSTRACT

In the present inventive method, individual traces of seismic data are migrated (41) without any assembling of different midpoints or any summing of different offsets, so that post-migration processing or analysis, e.g. trace alignment, may be applied to the individual migrated traces (42) to compensate for any deficiencies among them, before stack and assembly. Thus, the present invention fully separates the steps of migration (41), assembly (43), and stacking (44), which are combined together in traditional migration. Thus, imaging deficiencies can be measured and addressed in the image space before they are obscured by summation. Afterward, summation can proceed to construct the improved final image (45).

6 Claims, 7 Drawing Sheets

(56) References Cited

U.S. PATENT DOCUMENTS

| | | |
|---|---|---|
| 6,529,833 B2 | 3/2003 | Fanini et al. |
| 6,611,764 B2 | 8/2003 | Zhang |
| 6,640,190 B2 | 10/2003 | Nickel |
| 6,643,589 B2 | 11/2003 | Zhang et al. |
| 6,711,502 B2 | 3/2004 | Mollison et al. |
| 6,751,558 B2 | 6/2004 | Huffman et al. |
| 6,757,216 B1 | 6/2004 | Varnai et al. |
| 6,760,667 B1 | 7/2004 | Kelly et al. |
| 6,785,612 B1 | 8/2004 | Zhang |
| 6,820,010 B1 | 11/2004 | Sahai et al. |
| 6,871,146 B1 | 3/2005 | Kelly et al. |
| 6,885,947 B2 | 4/2005 | Xiao et al. |
| 6,904,368 B2 | 6/2005 | Reshef et al. |
| 6,917,564 B2 | 7/2005 | Leaney |
| 6,977,866 B2 | 12/2005 | Huffman et al. |
| 7,082,368 B2 | 7/2006 | Nickel |
| 7,162,463 B1 | 1/2007 | Wentland et al. |
| 7,184,991 B1 | 2/2007 | Wentland et al. |
| 7,188,092 B2 | 3/2007 | Wentland et al. |
| 7,236,886 B2 | 6/2007 | Frenkel |
| 7,295,706 B2 | 11/2007 | Wentland et al. |
| 7,308,139 B2 | 12/2007 | Wentland et al. |
| 7,355,923 B2 | 4/2008 | Reshef et al. |
| 7,418,350 B2 | 8/2008 | Stinson et al. |
| 7,421,346 B2 | 9/2008 | Goujon et al. |
| 7,523,003 B2 | 4/2009 | Robertsson et al. |
| 7,768,872 B2 | 8/2010 | Kappius et al. |
| 7,844,612 B2 | 11/2010 | Colgrave et al. |
| 7,894,298 B2 | 2/2011 | Manen et al. |
| 2006/0184488 A1 | 8/2006 | Wentland |
| 2007/0145980 A1 | 6/2007 | Conti et al. |
| 2008/0175478 A1 | 7/2008 | Wentland et al. |
| 2008/0225641 A1 | 9/2008 | Van Manen et al. |
| 2012/0316785 A1 | 12/2012 | Liu et al. |
| 2013/0030709 A1 | 1/2013 | Ferber |

OTHER PUBLICATIONS

Kabbej, A. et al. (2007), "Aperture optimized two-pass Kirchhoff migration," 77th Annual Meeting of the Soceity of Exploration Geophysicists, *Expanded Abstracts*, pp. 2339-2343.

Koren, Z. et al. (2011), "Full-azimuth subsurface angle doman wavefield decomposition and imaging Part I: Directional and reflection image gathers," *Geophysics* 76(1), pp. S1-S13.

Sava, P.C. et al. (2003), "Angle-domain common-image gathers by wavefield continuation methods," *Geophysics* 68(3), pp. 1065-1074.

\* cited by examiner

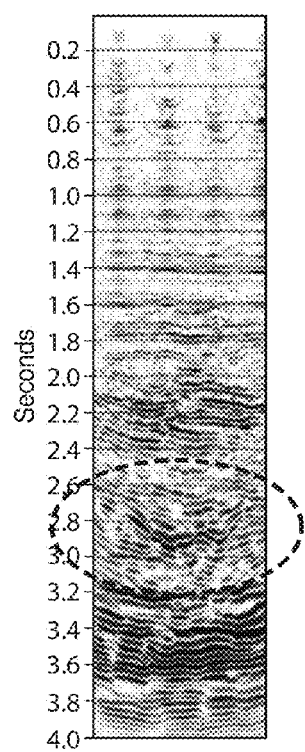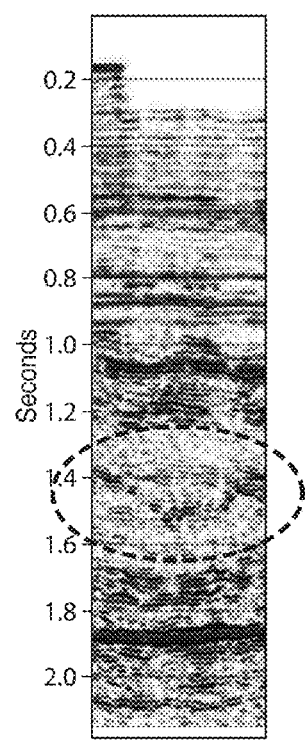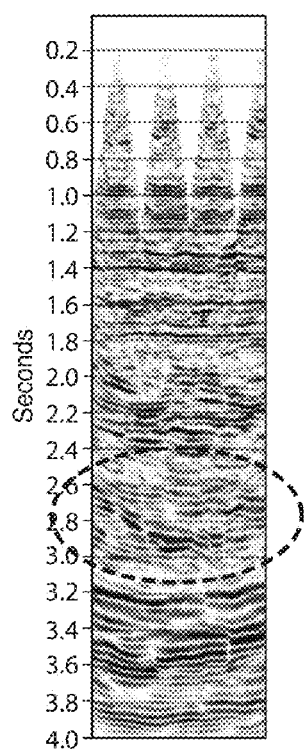
*FIG. 7A*   *FIG. 7B*   *FIG. 7C*

CREATING SEISMIC IMAGES USING EXPANDED IMAGE GATHERS

CROSS-REFERENCE TO RELATED APPLICATION

This application claims the benefit of U.S. Provisional Patent Application 61/874,281, filed Sep. 5, 2013, entitled CREATING SEISMIC IMAGES USING EXPANDED IMAGE GATHERS, the entirety of which is incorporated by reference herein.

FIELD OF THE INVENTION

The invention relates generally to the field of geophysical prospecting and, more particularly, to seismic data processing. Specifically, the invention is a method for creating seismic images using processing of expanded image-gathers.

BACKGROUND OF THE INVENTION

Exploration seismology is a field of study that concentrates on how to construct an image of the Earth's subsurface using measurements of seismic waves at the Earth's surface. The premise of image construction is that if we understand how seismic waves propagate in the Earth, we can computationally project the recorded waves back into an Earth model, and accumulate the projected waves into an image. The projection process is referred to as seismic migration. The accumulation process is referred to as diffraction stacking, but in the present invention it has been recognized that it can be split into two steps: one is conventionally referred to as "stacking" and the other may be referred to as "assembly". At locations where a subsurface object scattered the waves, the contributions from many measurements align by migration and constructively interfere by summation, thereby revealing the real locations of scattering objects. Contributions that are thought to be redundant constructively interfere by stacking, while contributions that are thought to be neighboring constructively interfere by assembly. The performance of the image construction process relies on how accurately the projection itself can be performed, and how well the subsurface model can be predicted, yet both factors even in the state-of-the-art have known deficiencies. Under the conventional imaging approach, migration, assembly, and most of stacking are performed together. Migration places redundant and neighboring contributions close to each other in the image space, yet if imaging deficiencies remain, the signals will not be aligned for optimum interference during summation, and premature summation prevents the measurement and compensation of many imaging deficiencies. The present invention addresses these deficiencies by completely separating the steps of migration and summation. By storing all individual contributing signals after migration, remaining imaging deficiencies can be measured and addressed in the image space before they are obscured by summation. Afterward, summation proceeds to construct the final image.

Partial separation of migration and stacking is common practice through the use of so-called "image gathers", but in this approach, image assembly is performed simultaneously with migration. The present invention fully separates the steps of migration, assembly, and stacking. The product of the present inventive method may be referred to as an "expanded image-gather" (EIG). Conventional image gathers allow the measurement of only velocity-related imaging deficiencies post-migration, whereas the present invention can be used to capture far more deficiencies. A representative reference for conventional image gathers is Sava and Fomel, "Angle-domain common-image gathers by wavefield continuation methods," Geophysics 68, 1065-1074 (2003).

A three-dimensional extension of the image gather, called "offset-vector tiling" (OVT) or "common offset-vector" (COV) gathering, is known in the literature. This type of image gather is designed to capture imaging deficiencies related to azimuthal variation in seismic velocity. OVT and COV gathers cannot address imaging deficiencies of other types, as migration and assembly are still performed together. In the 2D case, OVT and COV gathers each collapse to a conventional image gather, while the "expanded image gather" of the present invention remains expanded over the additional dimension required to keep migration and assembly separate. A representative reference for OVT and COV gathers is: Cary, "Common-offset-vector gathers: an alternative to cross-spreads for wide-azimuth 3-D surveys," Expanded Abstracts of the $69^{th}$ Annual Meeting of the Society of Exploration Geophysicists, 1496-1499 (1999).

A sub-class of existing image-gather technology is the so-called "dip-angle gather". A key difference between dip-angle gathers and the expanded image-gathers of the present invention comes from the physics built-in to the gather formation. During dip-angle-gather formation, geometrical calculations are made to predict and then collect image contributions based on a range of possible scattering and reflector dip angles. The expanded image-gathers of the present invention are formed with no assumptions regarding scatter or dip angle. A representative reference on dip-angle gathers is: Koren and Ravve, "Full-azimuth subsurface angle domain wavefield decomposition and imaging Part I: Directional and reflection image gathers," Geophysics 76, S1-S13 (2011).

A particular example of the dip-angle-gather approach is that of Kabbej et al., "Aperture optimized two-pass Kirchhoff migration," Expanded Abstracts of the 77th Annual Meeting of the Society of Exploration Geophysicists, 2339-2343 (2007). The "expanded" axis of the present invention is most simply thought of as acquisition midpoint, but it might possibly be construed to have some sort of geometrical equivalence to the midpoint-to-image-point dimension Kabbej and his co-authors introduce as "deport". However, they do not produce images using this extra dimension; they simply map a sparse subset of the data to this domain in order to estimate a well-known parameter called migration aperture, and then use the aperture to perform conventional migration. The present inventive method constructs images directly from the "offset-midpoint" (or "offset-deport") domain, and also permits processing in this domain.

SUMMARY OF THE INVENTION

In one embodiment, the invention is a method for obtaining a subsurface image from seismic data, comprising: (a) migrating, using a computer, individual traces of the seismic data, without any stacking of offsets or assembling of midpoints; (b) performing at least one processing technique on the migrated individual traces, resulting in processed data still in offset-midpoint domain; and (c) forming a seismic image of the subsurface directly from the processed migrated individual traces in the offset-midpoint domain.

BRIEF DESCRIPTION OF THE DRAWINGS

The present invention and its advantages will be better understood by referring to the following detailed description and the attached drawings in which:

FIGS. 7A-7C compare image examples from the actual data set: FIG. 7A shows a PS wave-mode image created using the present inventive method with EIG-based trace alignment; FIG. 7B shows a PP wave-mode image created using the conventional approach; and FIG. 7C shows a PS image using conventional approach, with identical parameters to the PS image in FIG. 7A.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
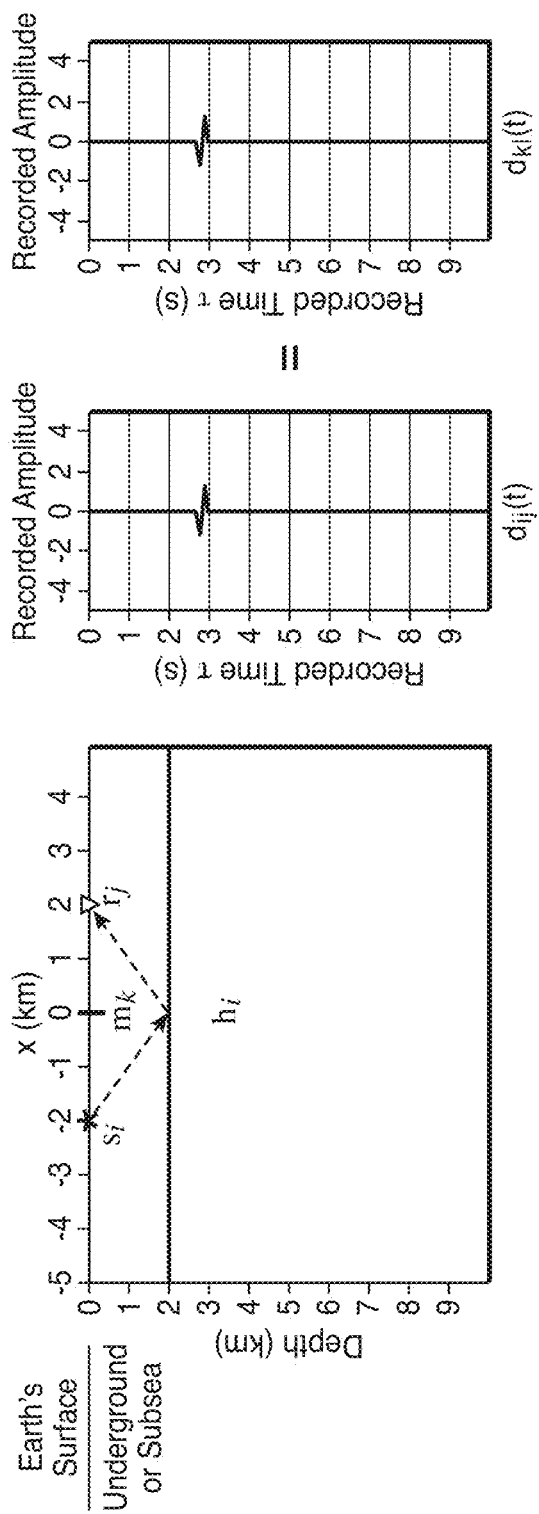
FIG. 1 is an example schematic of a seismic trace recording, indicating how a trace may be defined by its particular source and receiver or alternatively by the source-receiver midpoint and the source-receiver offset.

Seismic data are acquired by setting off many sources, which could be the same physical source moved to many different locations, and recording the earth's response at many receivers. The receivers begin making measurements at the moment the source is set off, and continue to take measurements for a certain amount of time. All data recorded by a particular source-receiver pair are called a trace; each trace is a 1D function of discrete recording time, t, and can be identified by its paired source and receiver positions, $s_i$ and $r_j$, respectively (see FIG. 1). Bold-face indicates vector notation (both are three-element vectors of acquisition coordinates such as longitude, latitude, and elevation), and subscript indicates the $i^{th}$ source or $j^{th}$ receiver out of all that were used during acquisition. In source-receiver terms, a single trace can be uniquely denoted as $d_{ij}(t)$, as indicated at the center of the drawing. For physical reasons, it is common and convenient to convert this description of a trace to be in terms of its source-receiver midpoint $m_k$ and offset $h_l$ (see FIG. 1). In midpoint-offset terms, the same trace can be denoted uniquely as $d_{kl}(t)$, as indicated at the right of the drawing. In FIG. 1, an individual source at position $s_i$ (indicated by star) emits a seismic wave that returns from an underground object, and is then recorded by an individual receiver at position $r_j$ (indicated by triangle). The wave path is indicated by dashed arrows. In this case, the object is a flat layer at 2 km depth, the source and receiver are offset 4 km, and the wave is traveling at a constant 2 km/s, so the wave arrives at the receiver at a time just before 3 s.

Figure 2:
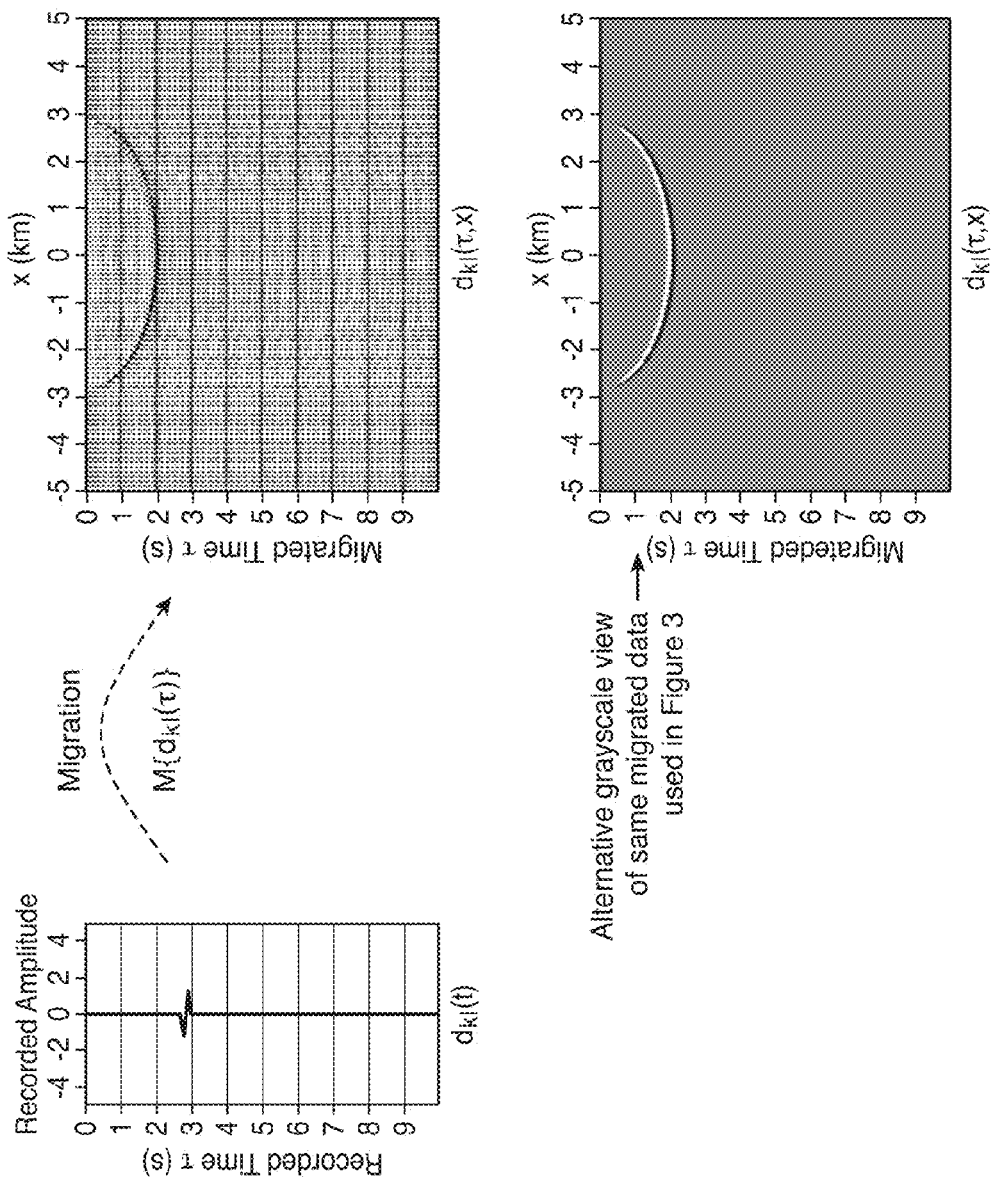
FIG. 2 shows a 2D example of time migration applied to the single trace from FIG. 1.

Each trace contains measurements of seismic waves that originated from the source, and could have returned to the receiver from an infinite number of unknown locations in the subsurface. The goal of seismic imaging is to determine which locations actually returned waves from the subsurface. First, the seismic wave velocity is estimated and the data are prepared through preprocessing. Then, by applying seismic wave physics, those infinite locations can be constrained to only those that could have realistically returned a particular wave. This process is called seismic migration—it maps recorded waves from each trace to all of their physically-realistic image locations; see FIG. 2, which schematically illustrates a 2-D example of time migration applied to a single trace $d_{kl}(t)$ from FIG. 1. There are many migration algorithms and methods. For present purposes, migration can be denoted as any operator $M\{\bullet\}$ that deterministically maps input from recorded coordinates to discrete image coordinates, $(\tau,x)$, where $\tau$ is the migrated time or depth, and x is the lateral surface-position (two elements) vector of the image space. For a single input trace, migration effectively expands the 1D function of time into a 3D volume of possible image coordinates:

$$D_{kl}(\tau,x)=M\{d_{kl}(t)\}.$$

Figure 3:
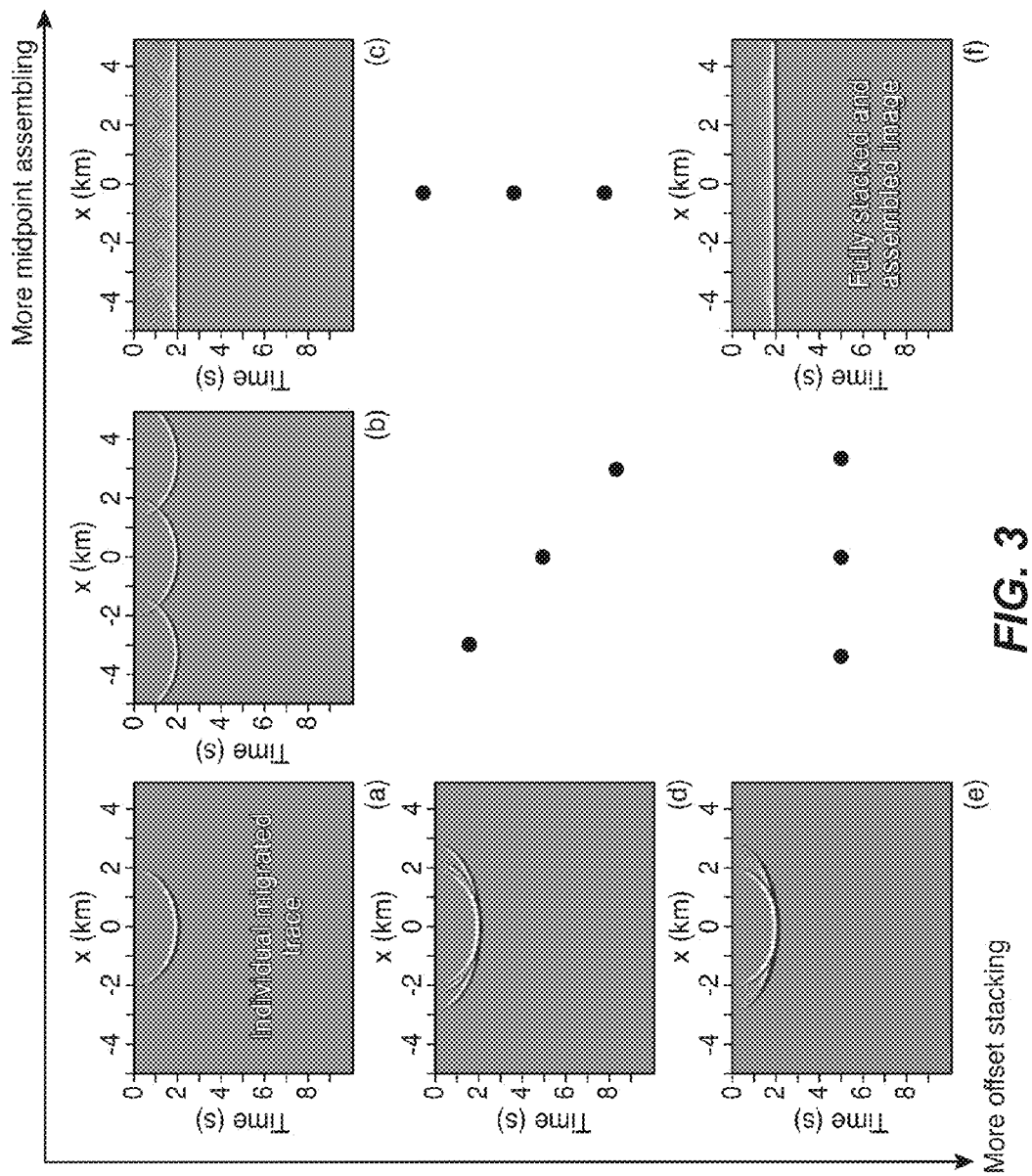
FIG. 3 shows an example of image construction by stacking and assembling migrated traces for the 2D model in FIG. 1.

After migration, there is still a subset of possible image locations from which a single wave could have returned. To finally constrain the actual image location among all of the physically-possible ones, reliance is placed on summing redundant measurements from all acquired traces at each potential image location. This summation process is called "diffraction stacking," and is a particular form of an imaging condition. FIG. 3 illustrates image construction by stacking and assembling migrated traces for the 2D model in FIG. 1: (a) A single migrated trace is shown with a midpoint at x=0. (b) Three migrated traces are assembled with the same offset, but different midpoints. (c) Many migrated traces are assembled with the same offset, but different midpoints. An image starts to appear. (d) Three migrated traces are stacked from the same midpoint at x=0, but different offsets. (e) Many migrated traces are stacked from the same midpoint at x=0, but different offsets. (f) Many migrated traces with different offsets and different midpoints are stacked and assembled. The event comes into focus because all contributions are aligned by migration. Imaging deficiencies among either offset or midpoint contributions would lead to a suboptimal, less focused image, especially for realistic geology. An object of the present invention is to keep individual migrated traces separate (such as the one in (a); there are three distinctly visible in (b)), to allow compensation for any deficiencies among them, before stack and assembly.

In locations that actually returned a wave to the receivers, migration will repeatedly map waves from different traces to that location, and they will sum constructively during summation. A consistent image will appear at such locations. In locations that really did not return a wave, the migrated contributions from many traces will tend to sum destructively, or interfere, and there will be no clear image after summation. Therefore, seismic imaging can be expressed generally as three steps which produce a single image, $I(\tau,x)$, from all acquired data, $d_{kl}(t)$: migrating all traces, summing over midpoint, and summing over offset:

$$I(\tau, x) = \sum_l \sum_k D_{kl}(\tau, x),$$

or, writing the migration operator explicitly:

$$I(\tau, x) = \sum_l \sum_k M\{d_{kl}(t)\}.$$

Figure 4:
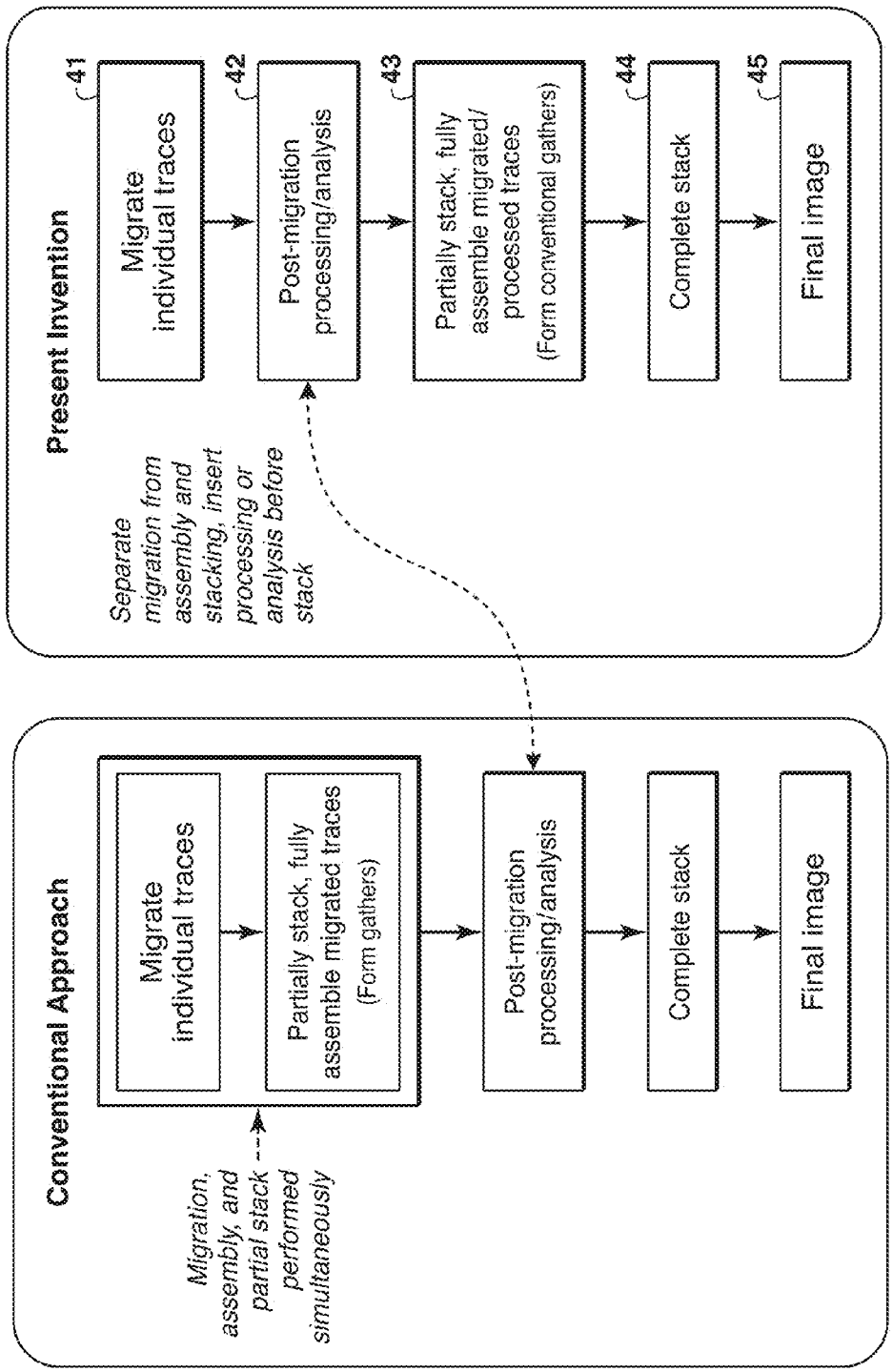
FIG. 4 is a flow chart comparing the conventional approach to the present inventive method.

The three steps to seismic imaging (migrating all traces, summing over midpoint, and summing over offset) are well known, but there are many variations on how to computationally implement them. Since the three steps represent a linear process, they can be decomposed, rearranged, or applied in combination. "Pre-stack" migration is the conventional approach to modern seismic imaging. The strategy is to migrate each trace before summation over offset, in the order described in the general imaging formula above. However, no one implements migration, midpoint-summation, and offset-summation as three truly separate steps (as is done in the present invention). FIG. 4 gives a convenient side-by-side comparison of the conventional approach to that of the present invention. The conventional pre-stack migration approach actually performs migration and midpoint-summation simultaneously, leading to a series of constant-offset images (one for each $h_l$), and the final image is subsequently constructed by summing these common-offset images. In other words, conventional "pre-stack" migration is actually only "pre-offset-summation" migration. In describing the present invention, the term "stack" is used in its most common sense, as summation over offset. Stacking is therefore represented by the summation operator, $\Sigma_l \bullet$ in the expressions above. Even when summing over offset, it is the current state-of-the-art to also simultaneously "bin" or partially stack over subsets of neighboring offsets to save memory or disk space or both. The other part of the full diffraction stack process—summation over midpoint—is conventionally performed simultaneously with migration. In the present invention, partial stacking is avoided as much as possible, and summation over midpoint is completely separated from migration. Summation over midpoint will be referred to as "assembly" in the following description.

In order to better see the differences between the present invention and the conventional pre-stack approach, it helps to introduce a symbol to highlight how the three steps of imaging are separated for each method. In the following, the half-bracket B⌈A notation is introduced to indicate that steps B and A are performed separately. The practical implication is that if the half-bracket appears between them, there is an opportunity to insert arbitrary processing operation(s) between applying steps A and B.

For pre-stack migration, there is no opportunity to insert additional post-migration processing except over offset. To see this, we expand the pre-stack migration imaging expression to its full form and use the half-brackets to indicate separate steps:

$$I(\tau, x) = \sum_l \left[ \sum_k M\{d_{kl}(t)\} \right].$$

Notice that the migration and assembly operators ($M\{\bullet\}$ and $\Sigma_k \bullet$) are inseparable. In any conventional approach, there is no opportunity to insert post-migration processing before assembly. The left side of FIG. 4 illustrates the conventional "pre-stack" imaging approach in a flow chart. In contrast, true pre-stack, pre-assembly imaging is performed in the present invention. The first half of the present inventive method is to form post-migration gathers which preserve offset and midpoint information. These gathers may be called "expanded image-gathers" (EIG), and for a particular image location x, they are the collection of the separate migrated contributions from all traces to that location. Image construction using EIGs can be expressed in the half-bracket notation as, $$I(\tau, x) = \sum_l \left[ \sum_k \lceil M\{d_{kl}(t)\} \right].$$

Notice the half-bracket between migration and assembly. This change appears subtle in the notation here, but it has many practical implications. The flow chart on the right side of FIG. 4 illustrates how preserving the migration response of each individual trace after migration (41) allows insertion (42) of any post-migration processing step or sequence, before stack and/or before assembly (43,44). These processing steps can be some or all of the processing steps that would normally be used in the conventional approach after partial stacking and full assembly. Alternatively, the processing steps inserted at step 42 can be certain steps selected based on experience, with additional processing optionally being performed after step 43 as in conventional processing. The sequence of steps shown on the right side of FIG. 4 can be applied over midpoint, offset, or both simultaneously. It is also possible to rearrange the data and apply processes across image positions x, source positions s, or receiver positions r, any combination of these dimensions, or across any of them simultaneously. Post-migration, pre-stack, pre-assembly processing in the EIG domain may be considered the second half of the present invention. With modern computational resources, image construction (45) using the present inventive method has become feasible, and could be made routine.

It will be understood that the post-migration processing or analysis techniques (42) are, for simplicity, sometimes referred to herein, for example in the claims, as post-migration processing, this terminology to be understood to include analysis techniques as well.

Other Embodiments, Operational Features, and Uses

In one embodiment, basic steps of the present inventive method for creating seismic images using processing of expanded image-gathers can be outlined as follows:
1. Store migration response of each individual trace.
2. Gather common-image-point contributions from all responses.
3. Perform additional processing or analysis on migrated responses.
4. Sum processed responses to form image.

The method of the present invention can be used to create seismic images or multi-component seismic images, and can be applied to sequential-source seismic data or simultaneous-source seismic data. The present inventive method can also be used, for example, to create ground-penetrating radar images.

In the 4-step method outlined above, it may be advantageous in step 1 to store migration responses binned only in offset, or alternatively to store migration responses binned non-trivially in both offset and midpoint (where single bin or "zero binning" is considered trivial). Similarly, it may be advantageous in step 2 to bin both offset and midpoint by magnitude and direction.

The additional processing step 3 may be to perform temporal or depth alignment of migrated responses, as in the examples discussed above. Alternatively, the additional processing of step 3 may be to apply surface-consistent processes. Examples of other alternatives for the additional processing of step 3 include any one of the following: velocity analysis, noise attenuation, diffraction/reflection separation, data interpolation, data regularization, and amplitude analysis.

EXAMPLES

Figure 5A:
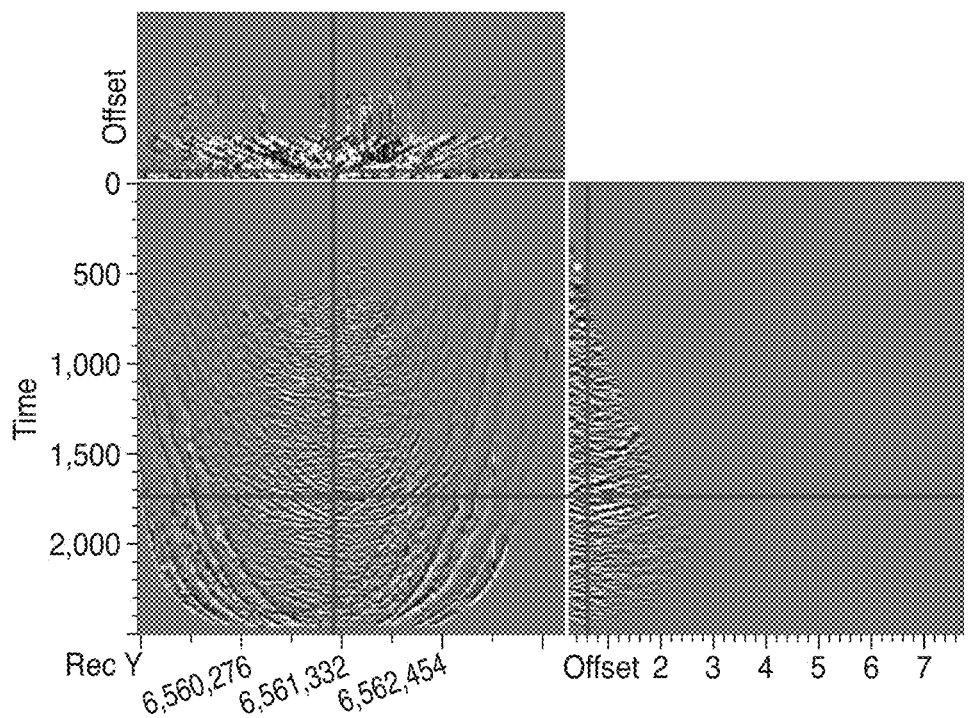
FIG. 5A shows an example of an Expanded Image Gather (EIG) of actual data using the present invention.
Figure 5B:
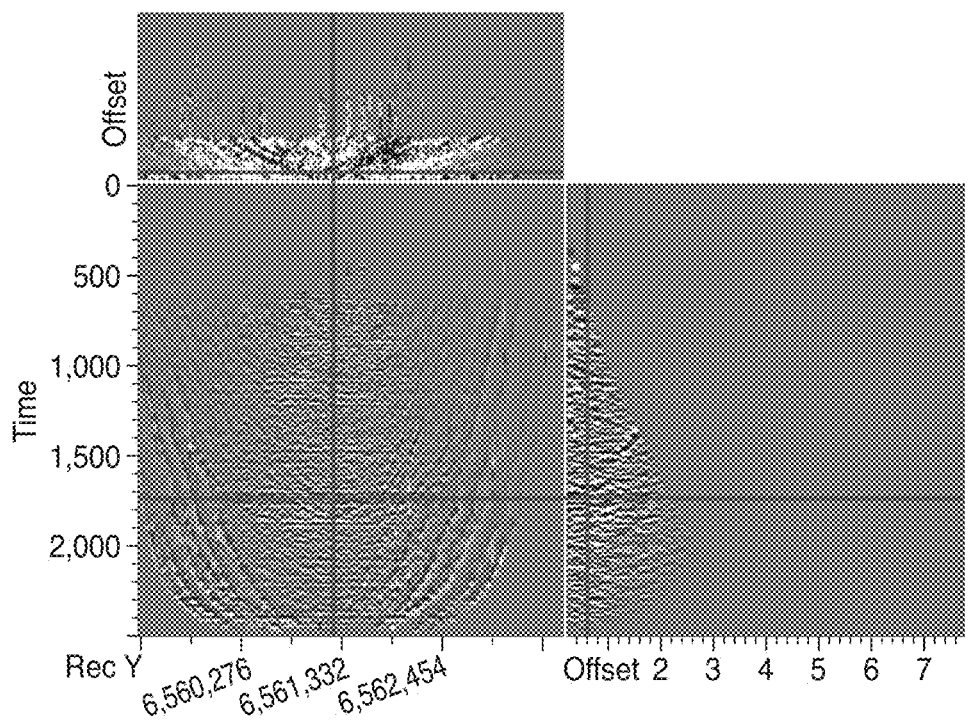
FIG. 5B shows the same EIG, but after a post-migration pre-stack trace alignment.

The first example shows an actual expanded image-gather from a migrated P-wave actual seismic data set. Each EIG is a cube of data, and in the views shown in FIGS. 5A and 5B, three panels show perpendicular slices through that cube: the top is a map-view of the gather, intersecting the cube at the horizontal crosshairs of the lower panels. The bottom-right panel of each view shows a variable-offset view of the gather intersecting the cube along the vertical crosshairs of the left and upper panels. The bottom-left panel shows data over various receiver Y-coordinates; these can be resorted in order of midpoint, but in any case represent the expanded dimension of the present inventive method. Summing over this dimension gives the conventional offset-dependent image gather for the common-image location shared by all of these traces. FIG. 5A shows an EIG directly outputted from migration, while FIG. 5B shows the same EIG after a post-migration pre-summation trace alignment. Trace alignment is just one example of a processing or analysis step that can be applied in the present inventive method. Any process or sequence of processes could be substituted for trace alignment.

Displaying a subset of EIGs throughout the data set can be used to interactively assess which processing steps are appropriate. For example, reflection and diffraction events have predictable geometries in this domain, and recognizing their misalignment in an EIG display would lead to applying a residual alignment correction or velocity analysis.

Figure 6A:
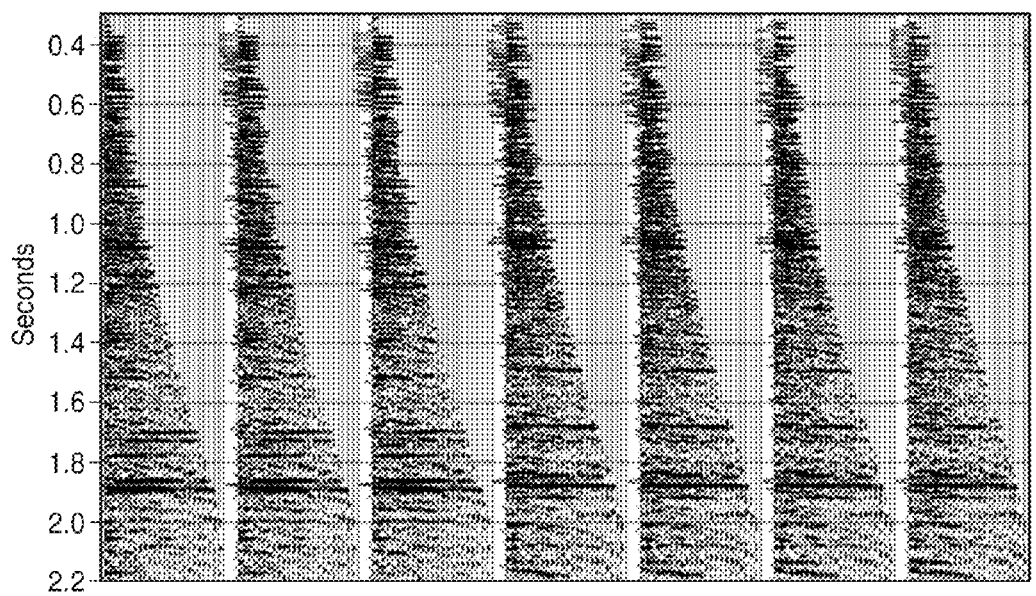
FIG. 6A shows an example of offset-dependent image gathers from actual data created by the conventional approach.
Figure 6B:
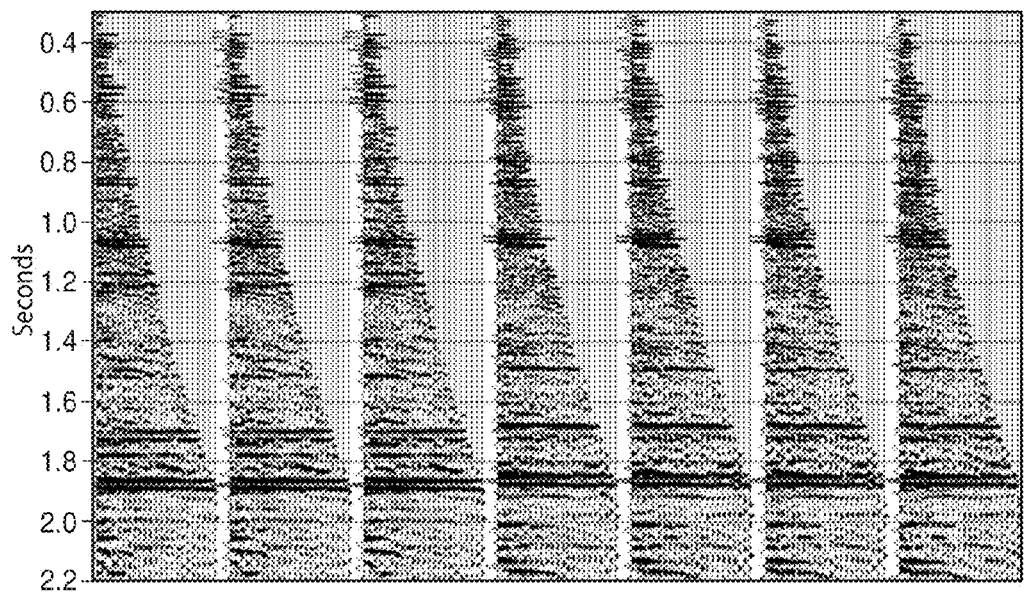
FIG. 6B shows offset-dependent image gathers created by first forming an EIG at each location, applying EIG trace alignment, and then summing over midpoint (assembly)

FIGS. 6A and 6B show conventional offset-dependent image gathers created without and with EIG alignment applied, respectively. In other words, 6A represents the conventional approach, whereas in 6B, offset-dependent image gathers were created by first forming an EIG at each location, applying EIG trace alignment, and then summing over midpoint (assembly). All other steps were identical. The gathers with EIG alignment have more coherent signal, and will therefore produce a higher quality final image. Conventional post-migration analysis and processing can be performed on either 6A or 6B, but the events in 6B are already higher quality and more coherent.

The final example of FIGS. 7A-7C shows an example of a seismic PS-wave image from actual seismic data with and without EIG alignment. PS-waves are a mode of seismic waves that convert upon reflection from compressional (P) to shear (S). Although a PS-image typically has lower lateral resolution than the more common P-wave image over the same area, it can provide valuable information about subsurface rock/fluid properties. FIG. 7A shows the same section-view (vertical axis is time) for the PS image with the present invention applied. FIG. 7C shows the identical data, with the identical processing flow/parameters, except no EIG alignment has been applied. PP images tend to be better resolved than PS images in exploration seismology, so the PP seismic image from the same location is shown in FIG. 7B as a reference. Image features previously invisible in the PS image (of FIG. 7C) are now clear (in FIG. 7A), and agree with features seen in the P-wave image (of FIG. 7B).

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims. In all practical applications of the present inventive method, some or all of the steps are performed using a computer, programmed in accordance with the disclosure herein.

The invention claimed is:

1. A method for obtaining a subsurface image from seismic data, comprising:
    migrating, using a computer, individual traces of the seismic data, without any stacking of offsets and assembling of midpoints, wherein the individual traces are earth's response to seismic waves originating from a source as recorded by a receiver;
    performing at least one processing technique on the migrated individual traces, using a computer, resulting in processed data still in offset-midpoint domain; and
    forming and displaying, with a computer, a seismic image of the subsurface directly from the processed migrated individual traces in the offset-midpoint domain, wherein the forming includes at least partially stacking of offsets and assembling of midpoints separately from the migrating, and the seismic image identifies location of structure in earth's subsurface that returned the seismic waves to receivers that recorded the seismic data.

2. The method of claim 1, further comprising completing stacking of the offsets and using them to form the seismic image.

3. The method of claim 1, further comprising gathering the migrated individual traces into common image point gathers before performing the at least one processing technique.

4. The method of claim 1, wherein the migrated individual traces are stored in computer storage or memory after the migrating step, binned only by offset.

5. The method of claim 1, wherein the at least one processing technique is selected from a group consisting of velocity analysis, noise attenuation, diffraction or reflection separation, data interpolation, data regularization, and amplitude analysis.

6. The method of claim 1, wherein the at least one processing technique is performing temporal or depth alignment of migrated responses, or is applying a surface-consistent process.

* * * * *